US012224690B2

(12) United States Patent
Saadat et al.

(10) Patent No.: US 12,224,690 B2
(45) Date of Patent: Feb. 11, 2025

(54) DRIVE DEVICE AND METHOD FOR OPERATING AN ELECTRICAL MACHINE

(71) Applicant: SEG Automotive Germany GmbH, Stuttgart (DE)

(72) Inventors: Nima Saadat, Stuttgart (DE); Christian Riecken, Stuttgart (DE); Murugaperumal Devaraja, Stuttgart (DE); Felix Egbert, Stuttgart (DE); Christian Stigler, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 174 days.

(21) Appl. No.: 18/082,119

(22) Filed: Dec. 15, 2022

(65) Prior Publication Data

US 2023/0188078 A1    Jun. 15, 2023

(30) Foreign Application Priority Data

Dec. 15, 2021  (DE) .......................... 102021133298.2

(51) Int. Cl.
*G05B 5/00*  (2006.01)
*H02P 29/00*  (2016.01)

(52) U.S. Cl.
CPC ................... *H02P 29/00* (2013.01)

(58) Field of Classification Search
CPC ......... H02P 29/00; H02P 29/027; H02P 9/006
See application file for complete search history.

(56) References Cited

U.S. PATENT DOCUMENTS

| 6,111,390 | A | 8/2000 | Inaba et al. |
| 2002/0117999 | A1* | 8/2002 | Yao .......................... H02P 9/102 322/59 |
| 2016/0365813 | A1 | 12/2016 | Graefling et al. |

FOREIGN PATENT DOCUMENTS

| DE | 19935260 A1 | 2/2000 |
| DE | 10256121 A1 | 6/2003 |
| DE | 102013217896 A1 | 3/2015 |
| EP | 1 696 554 A2 | 8/2006 |
| FR | 2944398 A1 | 10/2010 |
| JP | 2003-079195 A | 3/2003 |

OTHER PUBLICATIONS

Search Report for French Patent Application No. 2213247 dated Sep. 19, 2023, 2 pages.

* cited by examiner

*Primary Examiner* — Karen Masih
(74) *Attorney, Agent, or Firm* — Cozen O'Connor

(57) ABSTRACT

A drive device for operating an electrical machine has a regulator for driving a rotor winding, which has a highside switch and a de-energization switch. A first terminal of the rotor winding can be connected to a positive supply terminal via the high-side switch, the first terminal of the rotor winding can be connected to a negative supply terminal via a semiconductor component, and a second terminal of the rotor winding can be connected to the negative supply terminal via the de-energization switch. The drive device is arranged to enter a safe state in the presence of at least one fault by disconnecting and/or de-energizing the rotor winding from the positive supply terminal. At least one of the switches is designed to be redundant; and/or the regulator has a plurality of measuring points.

14 Claims, 5 Drawing Sheets

DRIVE DEVICE AND METHOD FOR OPERATING AN ELECTRICAL MACHINE

The present invention relates to drive devices and a method for operating an electric machine having a rotor winding and a stator winding, and to an electric machine.

BACKGROUND

Electrical machines can be used to convert mechanical energy into electrical energy and vice versa in motor vehicles. Usually, a power converter (or inverter) is used to drive or operate the electric machine and in particular energize phases of the stator winding. Typical electric machines have e.g. three, five, six or even more phases. For this purpose, the converter usually has one half-bridge per phase, which in turn comprises two switches each, e.g. MOSFETs, IGBTs or other semiconductor components. Furthermore, a drive circuit can be provided which serves to drive the individual switches of the half-bridges; these are, for example, gate driver circuits. This can be used, for example, to convert a DC voltage provided by an on-board power supply or a battery into an AC voltage for the stator winding; likewise, the converter can be used conversely, for example, in the sense of a rectifier.

Electrical machines can be electrically excited, i.e. a rotor winding (or excitation winding) is provided. For driving the rotor winding, a (voltage) regulator or control device may be provided, which is connected to the rotor winding. Such a regulator usually has at least one switch, e.g. MOSFET, IGBT or other semiconductor component, in order to be able to apply voltage, e.g. from the on-board power supply or the battery, to the rotor winding, i.e. in order to switch an excitation current on and off, for example. Likewise, however, a half-bridge can also be used here, comprising two switches, a highside and a lowside switch. Here, too, a drive circuit can be provided that serves to drive the switch or switches, i.e., a so-called gate drive circuit.

Depending on the type of electrical machine and the number of phases of the stator winding, one or more of these drive circuits (gate drive circuits) can be used in total to drive the regulator and the half-bridges of the converter. A drive circuit can therefore also drive several half-bridges, e.g. that of the regulator and e.g. two of the converter.

The one or more control circuits can in turn be connected to a computing unit such as a microcontroller unit (MCU) or a motor/engine control unit, e.g. via a serial peripheral interface (SPI). From there, the control circuits can then receive corresponding control commands, which they implement.

SUMMARY

According to the invention, drive devices and a method for operating an electric machine as well as an electric machine with the features of the independent patent claims are proposed. Advantageous embodiments are the subject of the dependent claims and the following description.

The invention is concerned with the operation of an electric machine with rotor winding and stator winding, using a drive device with a regulator and, in particular, also a power converter (so called inverter) and, if necessary, one or more associated drive circuits, as already explained in more detail at the beginning.

Protective functions can be provided to protect the electrical machine, the drive device with power converter, regulator and their control circuits, but also the computing unit or the on-board network with possibly other loads or consumers in the event of a fault. Such faults or abnormal conditions are e.g. overcurrent or overvoltage. If such a fault is detected, the entire drive device or individual components can be informed about it; this can be done by activating a shutdown path so that the drive device switches to a safe state. For example, the rotor winding should be disconnected from the on-board power supply and discharged.

In this context, a safe state in the case of a power converter means in particular the interruption of a current flow into the vehicle's electrical system either by short-circuiting the phases of the electrical machine or by passive methods such as Zener or TVS diodes (transient voltage suppression diodes).

An exemplary operation in which some or all of the phases of the electrical machine are intentionally short-circuited is also referred to as an active short-circuit or active phase short-circuit. As a rule, either all high-side switches (switches that connect the phases to the positive terminal or positive pole of the on-board voltage) of the half-bridges of the converter or all low-side switches (switches that connect the phases to the negative terminal or negative pole of the on-board voltage (=ground)) of the half-bridges of the converter are closed at the same time (switched to conductive). The other switches are then usually opened (switched to non-conducting).

Discharging the rotor winding or the energy stored in it (so-called de-excitation) is usually performed (e.g. in the case of a half-bridge in the regulator) by opening the switch via which the rotor winding is connected to the positive terminal or positive pole of the on-board power supply voltage, so-called B+ (highside switch); this disconnects the main supply from the exciter circuit (the circuit with the rotor or exciter winding). The other switch (lowside switch, suitably actuated in control mode) is closed and another switch (a de-energizing switch, which is closed in normal operation) is opened for de-energizing, so that the current can flow through an electrical resistor (de-energizing resistor), which is connected, for example, in parallel with the safety switch (a circuit current then occurs in a de-energizing circuit) and is thus de-energized. It should be noted that instead of the lowside switch, another semiconductor component such as a (freewheeling) diode can also be used.

To detect errors, various signals can be used which are interrogated. Such signals may include, for example, an error signal for each drive circuit (gate driver circuit), an external error signal coming from outside, for example, and a general permission signal coming from the MCU, for example.

In the normal state, i.e. when there is no fault in the operation of the electrical machine, these signals can all supply the value 1, for example. An AND operation in a query (in a fault detection circuit) can then be used to ensure that the safety switch remains closed. As soon as one of the signals changes its value, e.g. to 0, the safety switch is opened.

In such a drive device for operating an electrical machine, however, various faults or problems can occur which cannot be rectified or cannot be rectified sufficiently with the possibilities explained above, i.e. a safe state cannot be entered. In the following such errors shall be pointed out.

a) In the event of a fault in the highside switch of the regulator (e.g. continuous ON), the safe state cannot be guaranteed because the rotor winding (exciter winding) cannot be disconnected from the power supply (i.e. B+).

b) In the event of a fault in the lowside switch of the regulator (i.e. interruption in both directions), the safe state cannot be guaranteed because a current is not possible during de-energization, i.e. the de-energization circuit cannot be formed or closed.

c) In the event of a fault in the de-energizing switch (e.g. continuous ON) of the regulator, the safe state cannot be guaranteed because a circuit current may not be guaranteed during de-energization via the discharge resistor.

d) In the event of a fault in the discharge resistor (e.g. short circuit or non-conduction), the safe state cannot be guaranteed because the energy stored in the excitation coil cannot be dissipated (consumed) in the resistor.

e) If a fault detection circuit or a safety interrogation circuit ("fault detection circuit") cannot detect the fault, the safe state cannot be assumed already due to the lack of detection of a fault.

f) The occurrence of an internal fault in the drive circuits (gate driver circuits) can cause the drive circuit to fail to respond in the event of an overvoltage or other fault. Therefore, a safe state cannot be entered in the event of a single fault. Higher safety levels can thus also not be achieved.

g) This applies equally to faults in a switch of the half-bridges of the power converter (e.g. if one of the switches, for example a lowside switch, remains permanently open or non-conductive=continuous off).

h) If a fault occurs in the MCU (or other corresponding computing unit) or communication with the MCU, then initiating or causing the safe state is not possible because the MCU cannot provide a high level of safety to protect the system.

i) Latent faults that impair the availability of passive voltage limiting cannot be detected, since this would require an overvoltage outside the typical operating range to be applied to the drive device, which is not normally possible. Therefore, when used in safety-critical systems, the methods explained above are usually not allowed or only allowed with high limits.

Within the scope of the present invention, various possibilities are now proposed by means of which one or more of the above cases in which faults do not lead to the safe state can be eliminated or circumvented. In particular, the various ways proposed may also be combined or used together.

According to one aspect of the invention, at least one of the switches of the regulator is designed redundantly. In particular, an additional highside switch can be connected in series with the highside switch so that the highside switch is designed redundantly. This makes it possible to reliably isolate the rotor winding from the positive supply connection (B+), even if one of the highside switches should be defective or permanently conductive or otherwise cannot be opened (permanently on).

In an embodiment, an additional de-energizing switch can also be connected in series with the de-energizing switch, so that the de-energizing switch is designed redundantly. At least one diode, in particular a TVS or Zener diode, is then connected in parallel with the de-energizing switch and/or the additional de-energizing switch and is connected in the de-energizing circuit. Two (or more) diodes connected in series in parallel with the de-energizing switch can also be used in each case. The discharge resistor, which was mentioned at the beginning, can thus be omitted. The de-excitation can then take place via one or more of these diodes.

TVS diodes are used to achieve faster de-excitation, especially compared to the use of a discharge resistor. Alternatively, Zener diodes can be used to achieve the same effect. By using two de-excitation switches, e.g. MOSFETs, with their parallel diodes, if one of these switches or diodes or sets of diodes fails, the other switch with diode can still support the de-excitation process.

In an embodiment, the drive device also comprises two safety interrogation circuits which receive at least one common fault signal and which are each and independently arranged to cause the safe state to be entered, in particular by, with the rotor winding connected, de-energizing the rotor winding. If one of these safety interrogation circuits (or safety logics) does not respond during operation or during execution or initiation of the safe state, the other can ensure the de-energization operation.

In an embodiment, at least one diode is connected in parallel to the lowside switch, if present. In an embodiment, several diodes are connected in parallel to the lowside switch (i.e. in parallel to each other and to the switch). This increases the reliability and robustness of the circuit. If the lowside switch fails, these diodes can guarantee the continuity of the de-energizing circuit and also reduce the thermal stress on the lowside switch.

In a further aspect of the invention, the regulator has a plurality of measuring points, in particular measuring resistors, e.g. two or three, which are each provided between the second connection of the rotor winding and the negative supply connection of the drive device or are connected there. Thus, the plurality of measuring points or measuring resistors are, for example, each connected in series with the de-energizing switch and/or the further de-energizing switch. In particular, the plurality of measuring points or measuring resistors are also connected in parallel with each other. In addition, a plurality of overcurrent measuring devices are provided, each of which is set up to detect a current in the exciter winding via a respective one of the measuring points or measuring resistors and to cause the exciter winding to assume the safe state at least when the measured current exceeds a predetermined threshold value.

A current measuring device (or current measuring circuit) is first used to measure the excitation current. This can be done via the measuring resistors or otherwise at the measuring points. If an overcurrent occurs, this error (overcurrent) is detected by an overcurrent measuring device (e.g. comparator) and it is possible to react to this error accordingly. A common fault with a measuring resistor is an open circuit, so a parallel (further) measuring resistor can provide the current path for excitation and de-excitation current as well as monitoring of the excitation current.

The measuring points or measuring resistors can in particular be arranged or connected in such a way that they lie in the de-energizing circuit. In this case, the measuring points or measuring resistors are also connected in series with the diodes that are connected in parallel with the de-energizing switches. However, the measuring points or measuring resistors can also be arranged or connected in such a way that they are not in the de-energizing circuit.

In a further aspect of the invention, the drive device comprises a plurality of overvoltage measuring devices, each of which is arranged to measure a voltage and, at least when the measured voltage exceeds a predetermined threshold, to cause the drive device to enter the safe state. In an embodiment, one or more of the overvoltage measuring devices are each arranged to measure a voltage in one of the drive circuits. Alternatively or additionally, one of the overvoltage measuring devices is preferably arranged to measure a voltage between the positive and negative supply terminals of the drive device.

Since the avoidance of overvoltage is one of the most important safety objectives for electrical machines, in particular also when used as vehicle drives, it is of particular advantage to implement several, e.g. three independent overvoltage measuring devices or overvoltage detection functions to increase the safety level. An overvoltage measuring device with a similar operating principle can be provided in each drive or gate driver circuit, as well as an external overvoltage measuring device that acts independently of the implemented function in the gate driver circuits.

To further increase safety, a voltage limiting circuit, for example also in the form of one or more series-connected TVS or other diodes, can be provided between the positive supply terminal (B+) of the drive device and the negative supply terminal (B−) of the drive device. This can serve in particular as a further backup to prevent overvoltage.

In the ways described, one or more of the above-mentioned faults can still be detected, or the safe state can still be entered. At this point it should be noted that the various proposed precautions can be used individually, in any combination or together.

The invention also relates to an electric machine with rotor winding and stator winding and with a drive device according to the invention.

The invention also relates to a method for operating an electrical machine with rotor winding and stator winding using a drive device according to the invention.

In this case, in the presence of at least one fault, a safe state is entered during operation by disconnecting and/or de-energizing the rotor winding from a positive supply connection.

With regard to the advantages and further embodiments of the electric machine and the method, reference is made to the above statements on the drive device, which apply here accordingly, in order to avoid repetition.

Further advantages and embodiments of the invention will be apparent from the description and the accompanying drawing.

Embodiments of the invention are illustrated schematically by means of examples in the drawings and are described below with reference to the drawings.

EMBODIMENTS

Figure 1:
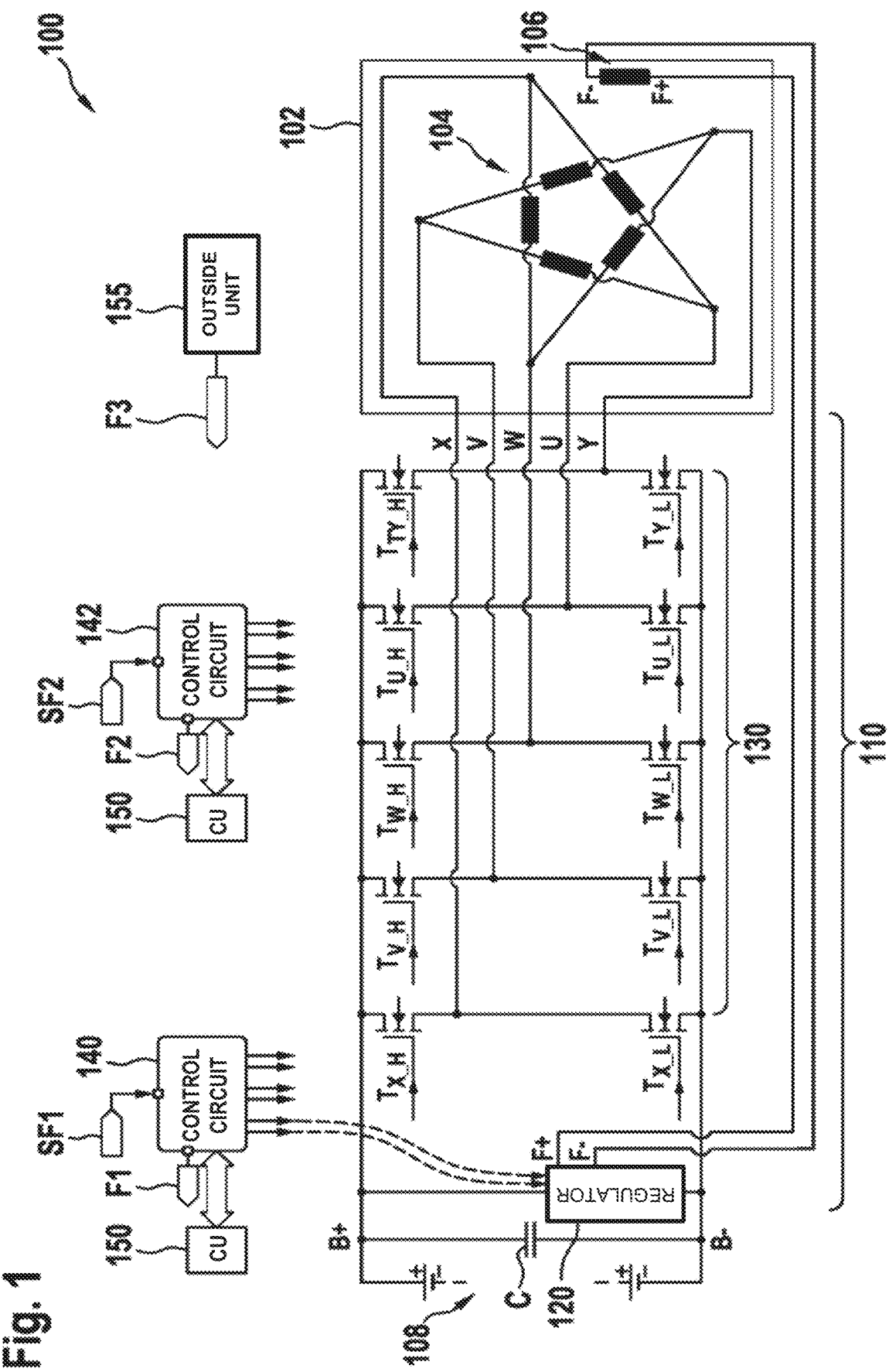
FIG. 1 shows a circuit diagram of an on-board power supply system with drive device for operating an electrical machine according to an embodiment of the disclosure.

FIG. 1 shows a circuit diagram of an on-board power system 100, in particular of a (motor) vehicle, with an electric machine 102 with stator winding 104 and rotor winding 106 as well as a battery or an energy storage device 108 with a positive on-board power system connection B+ and a negative on-board power system connection B− (ground), which serve as positive (plus pole) and negative supply connection (minus pole), respectively. In addition, a DC link capacitor C is provided.

By way of example, this is a five-phase electrical machine 102 having five phases U, V, W, X and Y or corresponding phase windings. It will be understood that the invention may also be used with other electrical machines having a different number of phases, e.g., three or six, etc.

Furthermore, a drive device 110 is provided, which comprises a voltage regulator (or regulator) 120, which is provided to apply an excitation current to the rotor winding 106 or to control the same. For this purpose, the rotor winding can be connected with its first terminal F+ and its second terminal F− to the regulator 120. For this purpose, the regulator 120 has two switches (a high-side switch and a low-side switch), which are shown in FIG. 2.

Furthermore, a power converter (or inverter) 130 is provided having one half-bridge per phase comprising two switches (one highside and one lowside switch), e.g. MOSFETs, IGBTs. These switches are designated $T_{U\_H}$ and $T_{U\_L}$ for highside and lowside switches of phase U, respectively; the same applies to the switches of the other phases V, W, X and Y.

Furthermore, two drive circuits or gate drive circuits 140 and 142 are provided. Each of the two drive circuits 140, 142 can drive six semiconductor switches, by way of example, and is for this purpose connected to one of the respective control or gate terminals (indicated by arrows). By way of example, the drive circuit 140 controls the two switches of the regulator 120 as well as the switches of the phases X and V. Correspondingly, the drive circuit 142 controls the switches of the phases U, V and W. The drive circuits 140, 142 can each receive signals from a higher-level computing unit 150, such as an MCU, or transmit signals thereto.

Figure 2:
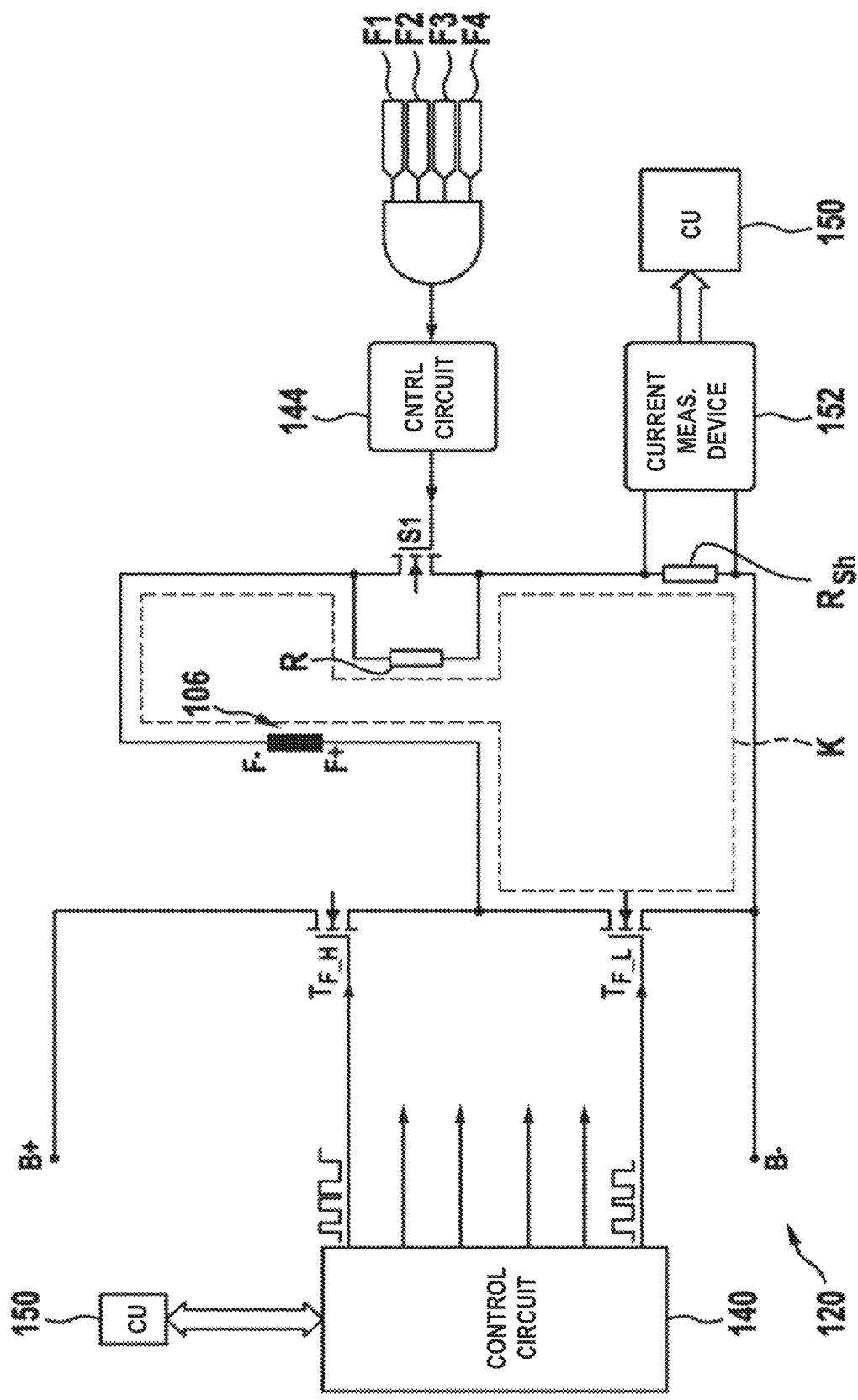
FIG. 2 shows a more detailed view of part of the drive device from FIG. 1.

FIG. 2 shows a more detailed view of part of the drive device 110 from FIG. 1, in particular the regulator 120. In particular, the high-side switch $T_{F\_H}$ and the low-side switch $T_{F\_L}$ are shown there, which are controlled via the control circuit 140, illustrated here as an example by pulses.

The high-side switch $T_{F\_H}$ is arranged between the first terminal F+ of the rotor winding 106 and the positive supply terminal B+ of the drive device. The lowside switch $T_{F\_L}$ is arranged between the first terminal F+ of the rotor winding and the negative supply terminal B− of the drive device. Furthermore, a de-energizing switch S1 is arranged between the second terminal F− of the rotor winding and the negative supply terminal B− of the drive device.

In normal operation, by closing (switching to conducting state) the lowside switch $T_{F\_L}$ and opening (switching to non-conducting state) the de-energizing switch S1, a de-energizing circuit can be formed via which the rotor winding 106 can be de-energized. Such a de-excitation circuit is designated K and includes a de-excitation resistor R connected in parallel with the de-excitation switch S1.

The drive device 110 is further arranged to assume or enter a safe state in the presence of at least one fault by disconnecting and/or de-energizing the rotor winding 106 from the positive supply terminal B+. For this purpose, the highside switch $T_{F\_H}$ can be opened and/or the de-energization switch S1 can be opened.

It is provided that, in the presence of an error, the control circuit 144 for the de-energizing switch is controlled in order to open the de-energizing switch. For this purpose, a series of error signals (present, for example, four, F1 to F4) can be evaluated. Depending on the type of error signal (e.g., "1" or "0" indicates error), a suitable logic operation is provided.

For example, an error signal, e.g. F1, F2, is assigned to each of the two control circuits 140, 142 (i.e. the respective control circuit outputs the respective error signal if there is an error there). Another error signal, e.g., F3, may be an external error signal, e.g., coming from outside (e.g., from a unit 155, at least outside the drive circuits 140, 142, but not from outside the entire power converter), and one, e.g., F4, may be a general permission signal, e.g., coming from the MCU 150.

In addition, a measuring or shunt resistor $R_{sh}$ is provided in series with the parallel circuit comprising the de-energizing switch S1 and the de-energizing resistor, and a current measuring device 152 is associated with this resistor for measuring the excitation current.

With reference to FIG. 1, the control circuits 140, 142 are each supplied with a safety signal SF1 and SF2, respectively, on the basis of which it can be judged whether everything is in order and the control circuits are to be operated regularly.

As explained, various faults or problems can occur in such a drive device which cannot be rectified or cannot be rectified sufficiently using conventional means, i.e. a safe state cannot be entered. Based on the drive circuit 110 shown in FIGS. 1 and 2, various embodiments of the invention will now be explained with reference to the following figures.

Figure 3:
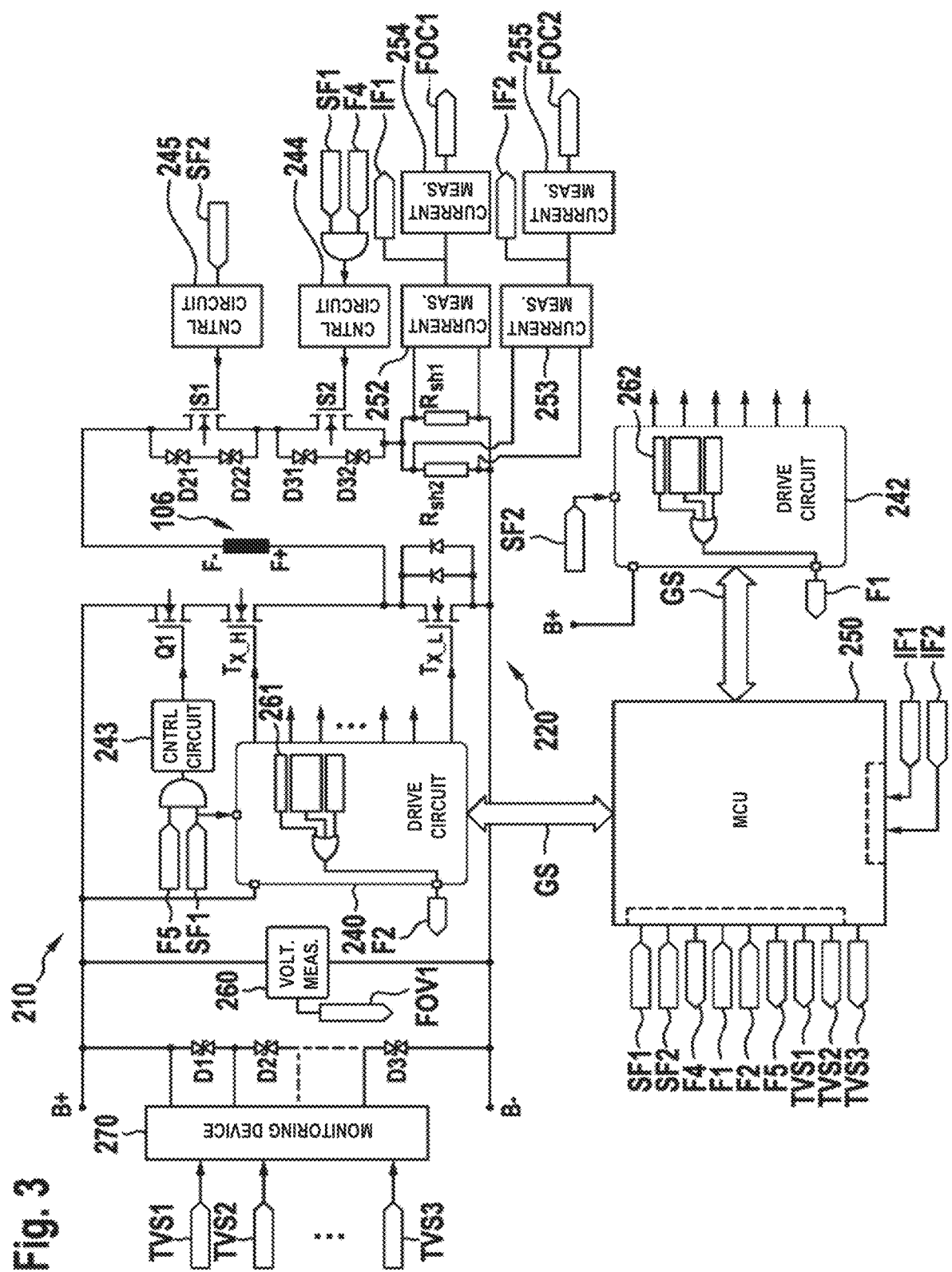
FIG. 3 shows an embodiment of a drive device according to the present disclosure.

FIG. 3 shows an embodiment of a drive device 210 according to the present disclosure. The drive device 210 corresponds in principle to the drive device 110 according to FIGS. 1 and 2, so that in this respect reference can also be made to the description there. The reference signs are each increased by 100. Differences will be discussed in particular below. A power converter (or inverter) is not explicitly shown, but this can be designed in accordance with the power converter 130.

In particular, the drive device 210 also comprises a regulator 220, which is provided for applying an exciter current to the rotor winding 106 or controlling the same. The regulator 220 is shown enlarged in FIG. 4a, in particular with regard to the interconnection of the individual switching elements.

In addition to FIG. 1, an additional highside switch Q1 is connected in series with the highside switch $T_{F\_H}$, so that the highside switch $T_{F\_H}$ has a redundant design. In the absence of a fault or defect, the additional highside switch Q1 is closed or conductive. If a safe state is to be entered, but the $T_{F\_H}$ highside switch was defective and could not be opened, the safe state can be entered via the additional Q1 highside switch. A separate control circuit 243 is provided for the additional highside switch Q1.

Furthermore, an additional de-energizing switch S2 is connected in series with the de-energizing switch S1, so that the de-energizing switch S1 is designed redundantly. In the absence of a fault or defect, the additional de-energizing switch S2—like the regular de-energizing switch S1—is closed or conductive. If a safe state is to be entered or the rotor winding is to be de-energized, but one of the de-energizing switches is defective and cannot be opened, the safe state can be entered via the other de-energizing switch. Two control circuits 244 and 245 are provided for controlling the de-energizing switches S1 and S2.

Furthermore, two diodes each, D21 and D22, or D31 and D32, respectively, e.g. TVS or Zener diodes, are connected in parallel to the de-energizing switch S1 and to the additional de-energizing switch S2. As can be seen, the diodes are located in the de-energizing circuit K. Due to the diodes, the de-energizing resistor shown in FIG. 2 is not (no longer) necessary.

Furthermore, two diodes, DF1 and DF2, are connected in parallel to the $T_{F\_L}$ lowside switch. This also provides a certain redundancy for the $T_{F\_L}$ lowside switch and increases its robustness. If the $T_{F\_L}$ lowside switch should be defective, the de-energization process is ensured by these diodes.

The regulator 220 also has two parallel measuring resistors $R_{sh1}$ and $R_{sh2}$ (measuring points) connected between the second terminal F− of the rotor winding and the negative supply terminal B− of the drive device. Thus, the parallel connection of the measuring resistors $R_{sh1}$ and $R_{sh2}$ is connected in series with the de-energizing switches S1 and S2.

Figure 4A:
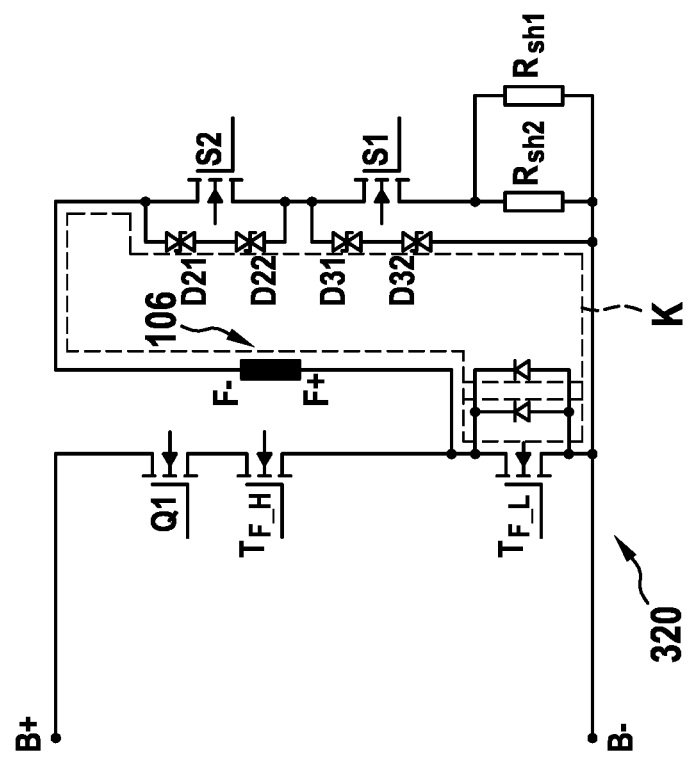
FIGS. 4a and 4b show parts of various embodiments of a drive device according to the present disclosure.

In the regulator 220 shown in FIG. 4a, the measuring resistors $R_{sh1}$ and $R_{sh2}$ are also each connected in such a way that they are located in the de-energizing circuit K. Thus, the parallel connection of the measuring resistors $R_{sh1}$ and $R_{sh2}$ is also connected in series with the diodes D21, D22, D31 and D32. In this way, the de-excitation runs faster.

Figure 4B:
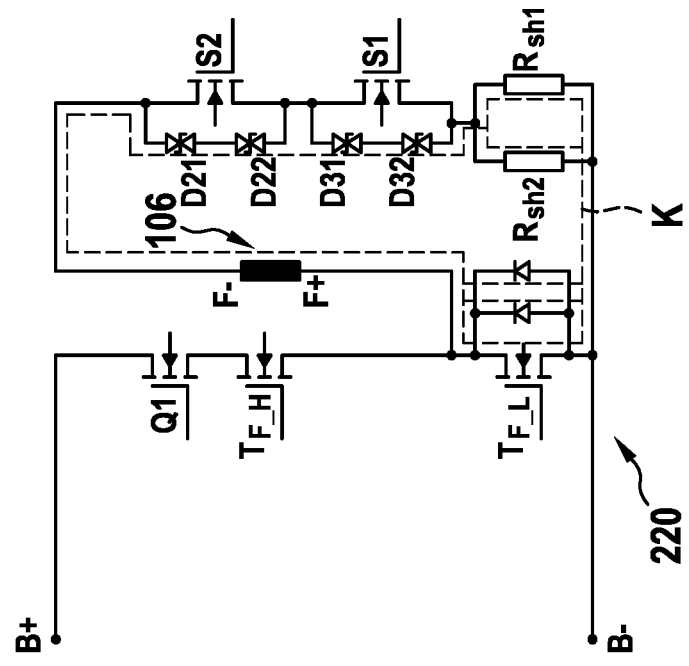

FIG. 4b shows a regulator 320 in a further embodiment. There, the parallel connection of the two measuring resistors $R_{sh1}$ and $R_{sh2}$ is also connected between the second terminal F− of the rotor winding and the negative supply terminal B− of the drive device. However, the measuring resistors $R_{sh1}$ and $R_{sh2}$ are not connected in the de-energizing circuit K, so they are not connected in series with the diodes D21, D22, D31 and D32. It should be noted, however, that in the case of the regulator 320, providing only the measuring resistor $R_{sh1}$ would also be sufficient, since there is no series connection with the diodes D21, D22, D31, D32 here.

Furthermore, the drive device 210 comprises two current measuring devices 252 and 253, each of which is arranged to measure a current in the excitation winding 106 via a respective one of the measuring resistors $R_{sh1}$ and $R_{sh}$; the overcurrent measuring devices 254, 255 can then cause the safe state to be entered, at least when the measured current exceeds a predetermined threshold value. Although this is shown in FIG. 3 only for the regulator 220, it is intended to apply mutatis mutandis to the regulator 320. As already mentioned, in the case of the regulator 320 also only one measuring resistor—and thus also only one current measuring device 252—is sufficient. Thus, if a circuit with only one measuring resistor or one current measuring device is to be realized, the regulating circuit device 320 is recommended.

Further, the drive device 210 comprises a plurality of overvoltage measuring devices 260, 261, 262, each of which is arranged to measure a voltage and to cause the safe state to be entered at least when the measured voltage exceeds a predetermined threshold.

The overvoltage measuring device 260 is adapted to measure a voltage between the positive supply terminal B+ and the negative supply terminal B− of the driving circuit. The overvoltage measuring device 261 is adapted to measure a voltage in the driving circuit 240, and an overvoltage measuring device 262 is adapted to measure a voltage in the driving circuit 242. In particular, the voltage in the drive circuits 240, 242 is also the voltage between the positive supply terminal B+ and the negative supply terminal B−.

Three diodes D1, D2 and D3, e.g. TVS diodes, are connected in series and are provided as an example between the positive supply terminal B+ and the negative supply terminal B− of the drive device. There can also be more than three. These diodes can absorb excess energy that needs to be dissipated, if required; in particular, they serve as a voltage limiting circuit or overvoltage protection device. The functionality of these diodes can be detected or monitored, for example, by a monitoring device 270.

FIG. 3 also shows various error signals which, in addition to those already known from FIGS. 1 and 2, also include other error signals.

Safety signal SF1: This is the output of the first safety interrogation circuit 501 (see FIG. 5). If all input signals of the safety interrogation circuit are "1" (logical value), this means that there is no fault in the drive device and the MCU has checked the other conditions and the programmed logic and gives permission to operate the drive device.

Safety signal SF2: This is the output of the second safety interrogation circuit 502 (see FIG. 5). If all input signals of the safety interrogation circuit are "1" (logical value), this means that there is no fault in the drive device and the MCU has checked the other conditions and the programmed logic and gives permission to operate the drive device.

Fault signal F1: When a fault such as an overvoltage (FOV, can be detected by the overvoltage measuring device 262), an overcurrent, an internal fault, etc. is detected in the drive circuit 242 (OR circuit), this logic level becomes "0", otherwise it is "1".

Fault signal F2: When a fault such as an overvoltage (FOV, can be detected by the overvoltage measuring device 261), an overcurrent, an internal fault, etc. is detected in the drive circuit 240 (OR circuit), this logic level becomes "0", otherwise it is "1".

Fault signal FOC1 (overcurrent in the excitation winding): The current through $R_{sh1}$ is sent (from the current measuring device 252) to a comparator (overcurrent measuring device 254) and compared with the desired setting. If the current exceeds the set threshold, the protection output becomes "0", otherwise it is "1".

Error signal FOC2 (overcurrent in the excitation winding): The current through $R_{sh2}$ is sent (from the current measuring device 253) to a comparator (overcurrent measuring device 255) and compared with the desired setting. If the current exceeds the set threshold, the protection output becomes "0", otherwise it is "1".

Error signal F4 (general permission signal): Signal from the MCU; e.g. if all control logics programmed in the MCU are fulfilled, the signal is "1", otherwise "0".

Error signal F5: The MCU gives the additional highside switch Q1 permission to close, so that the excitation circuit becomes ready for operation.

Signal IF1: Value of the measured excitation current at the measuring resistor Rsh1 determined by the current measuring device 252.

Signal IF2: Value of the measured excitation current at the measuring resistor Rsh2 determined by the current measuring device 253.

So-called SPI and gate signals GS, for example, can be exchanged between the drive devices 240, 242 and the MCU 250: The monitoring signal and the setting are transmitted and received via SPI. The generated PWM signals (to drive the switches) are sent to the drive circuits.

Safety state signal SF3 of the MCU: There may be special conditions within the logic programmed in the MCU; if these conditions are met, the signal is "1", otherwise it is "0".

Error signal FOV1 (overvoltage): Output of the overvoltage measuring device 260, which monitors the voltage of the DC link. If the voltage exceeds a certain threshold and drops at a certain time, this signal changes from "1" to "0".

Supply signal SF4: If all power supplies for SPI and digital I/O of the drive circuits and the MCU are available, this signal is "1", otherwise "0".

Figure 5:
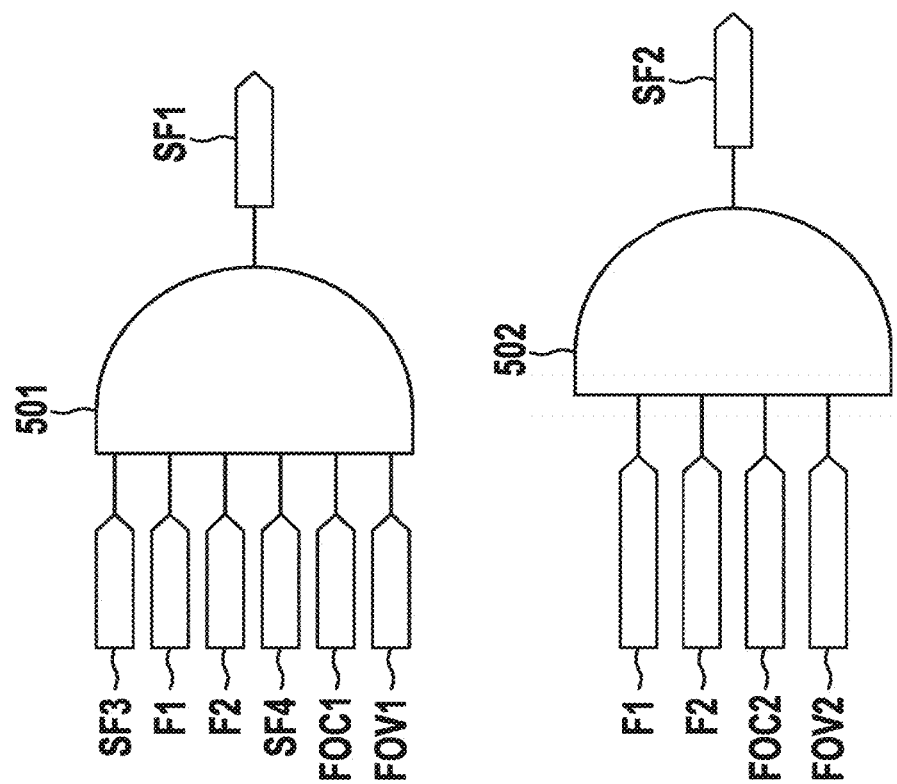
FIG. 5 shows a part of an embodiment of a drive device according to the present disclosure.

FIG. 5 also shows the two safety interrogation circuits 501, 502 for the aggregation (AND circuit) of fault signals to generate the safety signals SF1 and SF2. The safety interrogation circuits 501, 502 are independently arranged to cause the safe state to be entered, in particular by de-energizing the rotor winding. If, for example, one of the error signals SF1, SF2 at the input does not correspond to the desired or regular value (e.g. has the logical value "0" instead of "1"), the safety signal concerned can change from "1" to "0", for example. These safety interrogation circuits 501, 502 may in particular be part of the drive device 210 according to FIG. 3.

An exemplary operation of the electric machine using the drive device 210 will now be explained below.

A normal state means that there is no error and the drive device can control the electric machine regularly. In this mode the following actions are performed: All switches of the power converter are triggered, for example, by a PWM signal from the MCU (or another type of modulation signal generated by the MCU). To operate the electrical machine, the excitation must be on, so switches Q1, S1 and S2 are closed (conducting). Switches $T_{F\_H}$ and $T_{F\_L}$ are controlled by the MCU via drive circuit 240. The excitation current is controlled.

When one of the signals F1, F2, SF3, SF4, FOC1, FOC2, FOV1, FOV2 becomes "0", one or both of the safety signals SF1 or SF2 also becomes "0". Then the safe state is activated or initiated and the power converter enters the safe state, which means that all lowside switches, both of the power converter and the regulator, are closed (conductive state) and all highside switches are opened (non-conductive state).

The mechanism is activated by the safety signals SF1 (for the drive circuit 240) and SF2 (for the drive circuit 242); a suitable input terminal may be provided on the relevant drive circuit for this purpose.

The de-energizing process starts and continues until the energy stored in the rotor winding (excitation coil) reaches zero. The switches Q1, S1 and S2 are open. The de-excitation current (a circular current) flows through the switch $T_{F\_L}$ and the antiparallel diodes DF1 and DF2, then through the excitation coil and finally through the TVS diodes. The circular current is represented by a dashed line in FIGS. 4a and 4b, respectively.

A transient overvoltage on TVS diodes D21, D22, D31 and D32 turns on these TVS diodes and the excitation current flows through them during this mode. It should be noted that a suitable number of TVS diodes can be selected depending on the excitation voltage, the transient overvoltage in de-excitation mode, the thermal resistance of the components and the power dissipation of the TVS diodes. The nearly constant voltage of the TVS diodes helps to de-energize the coil much faster than when using a discharge resistor, as shown in FIG. 2.

As mentioned, the proposed circuit provides several ways (or mechanisms) to ensure the safe state of the drive device as well as the electrical machine in case of a fault.

Safety interrogation circuits (or state aggregators): Even though there are no exact redundancies to each other due to the two safety sensing circuits, the fault signals F1 and F2 are inputs to both safety sensing circuits; if one of the safety sensing circuits fails, the other can reach the safe state initiated by the drive circuits, as explained with reference to FIG. 5.

Overvoltage detection by the overvoltage measuring devices: There are three overvoltage measuring devices. These overvoltage measuring devices or their functions should be coordinated with each other in order to be able to react accordingly and protect the drive device. As mentioned, the overvoltage measuring devices are, for example, each implemented once in one of the two drive circuits and provided once externally. In case of a problem in one of these overvoltage measuring devices, two remaining overvoltage measuring devices can ensure a safe state of the drive device.

Diodes or TVS diodes for de-excitation: For example, there are two sets of TVS diodes and their parallel de-excitation switches (e.g., MOSFETs), namely de-excitation switch S1 with diodes D21 and D22, and another de-excitation switch S2 with diodes D31 and D32. In the event of a fault in one of the sets, the other set can ensure the de-energization process, albeit at a lower voltage (two TVS diodes instead of four TVS diodes in series), resulting in a slower de-energization process compared to four TVS diodes.

Diodes DF1 and DF2 in parallel with the lowside switch, $T_{F\_L}$, of the regulator: during the de-energizing process, switch $T_{F\_L}$ is closed. If this switch cannot be opened for some reason, the current flows through the parallel diode(s) and also the body diode of switch $T_{F\_L}$. By using two parallel diodes, each of which can carry the entire current, complex diagnostics for switch $T_{F\_L}$ can be avoided.

Active short circuit with de-energization due to the safety signals SF1 and SF2 via the drive circuits 240 and 242: The active short circuit for the drive circuit 242 can be defined, for example, as the generation of a short circuit by the lowside switches of the phases U, W and Y, which means that the lowside switches $T_{U\_L}$, $T_{W\_L}$ and $T_{Y\_L}$ are closed (cf. FIG. 1). The drive circuit 242 performs this active short circuit when an input connection request of the drive circuit 242 is activated via the safety signal SF2 or, if necessary, directly by an important protective measure such as the overvoltage measuring device 262. The active short circuit for the drive circuit 240 may be defined, for example, as the generation of a short circuit by the lowside switches of the phases V and X, which means that the lowside switches $T_{V\_L}$, $T_{XL}$ as well as $T_{F\_L}$ are closed. The drive circuit 240 performs this active short circuit when an input connection request of the drive circuit 240 is activated via the safety signal SF1 or, if necessary, directly by an important protective measure such as the overvoltage measuring device 261.

It should be noted that due to the thermal load on the lowside switches during the active short circuit, it is possible to switch such an active short circuit between highside and lowside switches (switching between highside and lowside switches). To achieve this switching function, for example, an oscillating circuit with adjustable frequency is required to change the gate signals of highside and lowside switches. Since switch Q1 is used to disconnect the excitation coil from the positive supply voltage in the safe state, switching between $T_{F\_H}$ and $T_{F\_L}$ is not a problem for the de-excitation process.

The de-energizing mechanism can be defined, for example, as the disconnection of the coil from the positive supply terminal B+ by opening switch Q1 and opening the two de-energizing switches S1 and S2. Switch $T_{F\_L}$ is closed because of the active short circuit in question; even if switch $T_{F\_L}$ remains open, the de-energizing current can flow through DF1 and DF2 (or the body diode if a MOSFET $T_{F\_L}$ is used).

(External) voltage limiting or overvoltage protection device: This especially represents a backup overvoltage protection device to cope with the overvoltage. If other mechanisms to suppress or detect the overvoltage (caused by other faults) in the system—for example, the active short circuits—fail, the TVS diodes D1, D2, D3 can absorb the residual energy and limit the voltage. The number of TVS diodes used and their characteristics depend on the voltage level of the DC network and also on the coordination of voltage and time as backup of other over-voltage measuring or protection devices.

The operability of these diodes can be checked via the aforementioned monitoring device 270 (or monitoring circuit) e.g. on instigation by the signals TVS1, TVS2 and TVS3. By bridging individual TVS diodes via a resistor (within 270), the voltage between the anode and cathode of the un-shorted TVS diodes can then be monitored, for example, particularly during the start-up process. The MCU then determines, for example, the state or functionality of the TVS diodes.

Excitation current measurement and overcurrent detection of the excitation circuit by the mentioned measuring resistors and overcurrent measuring devices: As shown in FIG. 3, the excitation current can be measured using two shunt or sense resistors (Rsh1 and Rsh2). The output of the measured current is sent to the MCU for control purposes (i.e. signal IF1 and IF2). Two overcurrent (OC) measuring devices monitor the field current. For example, if the field current exceeds a certain threshold (e.g., set point) for a certain time, the output of these detection mechanisms changes from "1" to "0" (in terms of logic levels). This leads to a safe state by activating the safety signals SF1 and SF2.

If one of the sensing resistors fails, the MCU detects the sudden change in excitation current and considers that as a sensor failure. It should be mentioned that if there is only one sensing resistor and this resistor would become non-conductive, the entire de-energizing circuit would be an open circuit; therefore, two paths for current sensing are appropriate. Depending on system requirements and ambient temperature, other types of current sensors such as Hall-effect sensors (or other suitable types) can be used at appropriate (e.g. two) measurement points, for example.

To create a more reliable de-energizing circuit, diode D32 can be connected directly to the negative supply terminal or directly to the relevant busbar (as shown in FIG. 4b). If the sense resistors fail, the de-energizing circuit is not disconnected and the de-energizing current always flows through the TVS diodes (i.e. D21, D22, D31 and D32). A minor disadvantage here is that it is not possible to measure the de-energizing current, but as a general rule this is not relevant, especially when the circuit transitions to a safe state. This direct connection of TVS diodes to B− would be essential when using a single measuring resistor.

The invention claimed is:

1. A drive device for driving an electrical machine having a rotor winding and a stator winding, comprising a regulator connectable to the rotor winding and arranged to drive the rotor winding, the regulator comprising a plurality of switches including a highside switch and a de-energizing switch,
    wherein the highside switch is arranged such that a first terminal of the rotor winding can be connected via the the highside switch to a positive supply terminal of the drive device,
    wherein a semiconductor component is arranged in such a way that the first terminal of the rotor winding can be connected via the semiconductor component to a negative supply terminal of the drive device,
    the de-energizing switch being arranged in such a way that a second terminal of the rotor winding can be connected via the de-energizing switch to the negative supply terminal of the drive device,
    wherein the semiconductor component and the de-excitation switch are arranged and set up such that, when in normal operation the semiconductor component is conductive and the de-excitation switch is opened for de-excitation, a de-excitation circuit is formed via which the rotor winding is de-excited, wherein the drive device is arranged to enter a safe state in the presence of at least one fault by disconnecting the rotor winding from the positive supply terminal and/or, with the rotor winding connected, de-energizing the rotor winding, the drive device comprising at least one of:
a) at least one of the plurality of switches of the regulator is designed redundantly,
b) the regulator has a plurality of measuring points, in particular measuring resistors, which are each provided between the second terminal of the rotor winding and the negative supply terminal of the drive device, and having a plurality of overcurrent measuring devices which are each set up to detect a current in the exciter winding at a respective one of the measuring points and, at least when a predetermined threshold value of the measured current is exceeded, to cause the exciter winding to assume the safe state, or
c) the drive device comprises a plurality of overvoltage measuring devices, each of which is arranged to measure a voltage and, at least when the measured voltage exceeds a predetermined threshold value, to cause the voltage to enter the safe state.

2. The drive device of claim 1, wherein an additional highside switch is connected in series with the highside switch such that the highside switch is redundant.

3. The drive device according to claim 1, wherein an additional de-energizing switch is connected in series with the de-energizing switch so that the de-energizing switch is designed redundantly.

4. The drive device according to claim 3, wherein at least one diode is connected in parallel at least one of the de-energizing switch and the additional de-energizing switch, which diode is located in the de-energizing circuit and comprises a transient voltage suppression (TVS) diode or a Zener diode.

5. The drive device according to claim 1, comprising two safety interrogation circuits which receive at least one common fault signal and which are each and independently arranged to cause the safe state to be entered, in particular, with the rotor winding connected, by de-energizing the rotor winding.

6. The drive device according to claim 1, wherein the plurality of switches comprises a lowside switch which is also the semiconductor component.

7. The drive device according to claim 6, wherein at least one diode is connected in parallel with the lowside switch so that the lowside switch is designed redundantly.

8. The drive device according to claim 1, wherein the plurality of measurement points are each located in the de-energizing circuit, or are not located in the de-energizing circuit.

9. The drive device according to claim 1, comprising a voltage limiting circuit between the positive supply terminal of the drive device and the negative supply terminal of the drive device.

10. The drive device according to claim 1, comprising a power converter having a plurality of half bridges each having two switches, the half bridges each being connectable to one of a plurality of electrical phases of the stator winding, and wherein the power converter is arranged to drive the stator winding, and the drive device comprising one or more drive circuits for driving the switches of the power converter and at least the highside switch of the regulator.

11. The drive device according to claim 10, wherein one or more of the overvoltage measuring devices are each arranged to measure a voltage in one of the drive circuits.

12. The drive device according to claim 1, wherein one of the overvoltage measuring devices is arranged to measure a voltage between the positive and negative supply terminals of the drive device.

13. An electric machine having a rotor winding and a stator winding, and having a drive device according to claim 1.

14. A method for operating an electrical machine according to claim 13,
wherein, in the presence of at least one fault, a safe state is entered during operation by disconnecting the rotor winding from a positive supply terminal and/or de-energizing the rotor winding.

* * * * *